United States Patent [19]
Whitehurst et al.

[11] Patent Number: 6,030,659
[45] Date of Patent: Feb. 29, 2000

[54] PHOSPHATE COATED UREA

[75] Inventors: Brooks M. Whitehurst; Garnett B. Whitehurst, both of New Bern, N.C.

[73] Assignee: Whitehurst Associates, Inc., New Bern, N.C.

[21] Appl. No.: 09/085,937

[22] Filed: May 28, 1998

[51] Int. Cl.$^7$ ....................................... B05D 7/00
[52] U.S. Cl. .................. 427/214; 427/212; 427/215; 427/299; 427/301; 427/333
[58] Field of Search .................... 427/212, 214, 427/215, 299, 301, 333

[56] References Cited

U.S. PATENT DOCUMENTS

| | | | |
|---|---|---|---|
| 2,950,961 | 8/1960 | Striplin, Jr. et al. | 71/42 |
| 3,240,586 | 3/1966 | Harris | 71/39 |
| 3,392,007 | 7/1968 | Christoffel et al. | 71/33 |
| 3,423,199 | 1/1969 | Philen, Jr. et al. | 71/1 |
| 3,425,819 | 2/1969 | Barry et al. | 71/29 |
| 3,520,651 | 7/1970 | Philen, Jr. et al. | 23/50 |
| 3,560,192 | 2/1971 | Cicco . | |
| 3,961,932 | 6/1976 | Miller | 71/1 |
| 4,073,633 | 2/1978 | Young . | |
| 4,549,897 | 10/1985 | Seng et al. . | |
| 4,587,358 | 5/1986 | Blouin . | |
| 4,752,317 | 6/1988 | Detroit . | |
| 5,152,821 | 10/1992 | Walter . | |

FOREIGN PATENT DOCUMENTS

| | | |
|---|---|---|
| 45576 | 2/1996 | Australia . |
| 1337460 | 10/1995 | Canada . |
| WO 97/22568 | 6/1997 | WIPO . |

OTHER PUBLICATIONS

Richard J. Lewis, Sr., Hawley's Condensed Chemical Dictionary, 12th Ed., pp. 448–449, 1993 (no month).

Don W. Green, Perry's Chemical Engineer's Handbook, 6th Ed., p. 21–15, 1985 (no month).

*Primary Examiner*—Shrive Beck
*Assistant Examiner*—Paul D. Strain
*Attorney, Agent, or Firm*—Rhodes & Mason, PLLC

[57] ABSTRACT

A method of coating urea by first wetting urea pellets with water or an aqueous acid solution, and then blended the wetted urea pellets with a phosphate salt. During the coating process, when using an aqueous acid solution, the acid liberates a portion of the phosphate to a form available to the plant, and reduces the loss of urea nitrogen due to volatilization.

7 Claims, No Drawings

PHOSPHATE COATED UREA

BACKGROUND OF THE INVENTION (1) Field of the Invention

The present invention relates generally to a method for coating urea, and in particular to a method for coating urea pellets or granules with phosphate to reduce nitrogen loss while providing a source of phosphorous. The invention also relates to the resultant products.

(2) Description of the Prior Art

Nitrogen and phosphorus are two of the primary nutrients for plant growth (Marshner, H. The Mineral Nutrition of Higher Plants. Second edition. Academic Press San Diego, Calif. 1995). Nitrogen is required by all plants to produce the proteins, DNA and RNA for growth and development. Phosphorus is required for energy metabolism and to build the backbone of the DNA and RNA molecules. Many approaches have been developed which can supply these nutrients to plants.

Urea is a widely used, non-burning source of nitrogen for plants and is generally sold in pelletized or granular form. When broadcast on the soil, the urea dissolves by absorbing water from sources such as irrigation, rain, or moisture from the air, dispersing the urea into the soil so that it is available to the plant.

Unfortunately, urea is subject to attack by urease enzymes from soil bacteria, which can lead to significant loss of the nitrogen available in urea. This attack by urease leads to the release of ammonia gas to the air by the reaction known as volatilization of nitrogen according to the following equation:

$$NH_2CONH_2 + H_2O \rightarrow 2NH_3 + CO_2 \tag{1}$$

Nitrogen losses due to volatilization can lead to as much as an 80% reduction in the available nitrogen applied as urea (Terman, G. L. Volatilization Losses of Nitrogen as Ammonia from Surface Applied Fertilizers, Organic Amendments, and Crop Residues. Advances in Agronomy 31: 189–223, 1979.) The loss of nitrogen by volatilization can be an important economic loss to the farmer or forester, since replacement of the lost nitrogen requires additional applications of nitrogen fertilizers, increasing crop production costs, and the potential for nitrogen run-off that can pollute surface water supplies.

Phosphorous can be supplied to the plant in a number of ways. Ammonium phosphate salts can be prepared by reacting ammonia with phosphoric acid by technology that is well established. Both solid and liquid products are made from ammonium salts, and are widely used to supply both nitrogen and phosphorus. Soluble calcium phosphate salts such as calcium dihydrogen phosphate ($Ca(H_2PO_4)_2$, monocalcium phosphate) can be used to supply phosphorus. This salt which provides both phosphorus and calcium to the plant must be produced from bone meal or phosphate mineral deposits.

In the fertilizer industry, the total phosphorus content of a fertilizer product is typically expressed in terms of percent $P_2O_5$. The term "available $P_2O_5$" refers to that phosphorus which can be extracted with citric acid from a phosphorus source. The term "insoluble $P_2O_5$" is the difference between total $P_2O_5$ and available $P_2O_5$. The term "water-soluble $P_2O_5$" refers to that phosphorus which is extractable with water from a phosphorus source. To remain consistent with industry practice, phosphorus content is expressed herein as percent $P_2O_5$ and will refer to total phosphorous content unless designated otherwise.

Phosphorus mineral deposits exist in nature as highly insoluble fluoroapatites ($CaF_2 \cdot 3\ Ca_3(PO_4)_2$). Each phosphate deposit in the world has a slightly different composition that is given as the total $P_2O_5$ content of the mineral obtained from the deposit. Major phosphorus deposits are found in Morocco and Jordan, and in the U.S. in Florida, North Carolina, and Utah.

Monocalcium phosphate can be prepared by reacting phosphoric acid with the fluoroapatite mineral according to Equation 2 (Austin, G. T. editor. Shreve's Chemical Process Industries fifth edition. McGraw Hill Book Company. New York, N.Y. 1984).

The use of the reaction shown in Equation 2 to produce triple superphosphate (fertilizer grade monocalcium phosphate, 46% available $P_2O_5$) is well known.

$$CaF_2 \cdot Ca_3(PO_4)_2 + 14H_3PO_4 \rightarrow 10Ca(H_2PO_4)_2 + 2HF$$

Other acids can be reacted with a fluoroapatite mineral. Sulfuric acid will form calcium sulfate and phosphoric acid when reacted with a fluoroapatite. Nitric acid will form calcium nitrate and phosphoric acid. Organic impurities in fluoroapatite minerals make sulfuric acid a better choice than oxidizing acids such as nitric acid. Organic acids, such as citric acid used in the test for available phosphorus, can also be used.

Coating urea pellets with an acid or acidic substance is known in the prior art. U.S. Pat. No. 4,073,633 teaches that it is possible to control the pH in the area so that the urea dissolves to slow the volatilization. This is accomplished by contacting urea with an acid or an acid salt. Many acids including phosphoric acid, sulfuric and nitric acid will work according to the '633 patent. Metal salts, which produce a solution with a pH of 5 or less such as ferric nitrate, ferric chloride, calcium dihydrogen phosphate can be used according to the '633 patent. The calcium dihydrogen phosphate disclosed in the '633 patent is the purified salt which is first dissolved in water. Kiseleglur or clay may be added to aid in the adhesion of the acid or aqueous solution and to ensure that a free flowing particle is formed.

Australian Patent No. AU 9645576 discloses that metal salts may be coated onto the surface of urea by first wetting the surface with water then mixing with tumbling action the dry salts with the wet urea. The following patents also describe methods whereby granular fertilizers may be coated: U.S. Pat. No. 3,423,199, U.S. Pat. No. 3,520,651, U.S. Pat. No. 3,560,192, U.S. Pat. No. 3,961,932 and U.S. Pat. No. 5,152,821.

The prior art teaches a number of methods whereby the decomposition of urea by soil enzymes can be prevented. One method is to provide a controlled release formulation, which can be achieved by reacting urea with and aldehyde (U.S. Pat. No. 3,322,528), or forming a polymeric structure that results in controlled release (U.S. Pat. No. 4,752,317). Protein degraded pre-vulcanized rubber, also, has been used to form urea fertilizers with slow release characteristics (U.S. Pat. No. 4,549,897).

Coatings that employ urease inhibitors such as phosphoric triamide compounds are very effective at inhibiting urease (U.S. Pat. No. 4,530,714). Improvements of this idea are presented in (WO 97/22568). A potential draw back to this approach is the cost of the inhibitor.

There is still a need, however, for an inexpensive and effective method of coating urea to reduce the loss of nitrogen through volatilization, while also providing a source of phosphorous, as well as a need for the resultant coated urea products.

SUMMARY OF THE INVENTION

In the present invention, urea pellets, the term being used herein to describe urea in pelletized or granular from, is first wetted with water or another aqueous material, preferably containing an acid to adjust the pH of the aqueous material to 2 or less. The wet urea is then coated with a pulverized phosphate coating.

Various acids can be used to adjust the pH of the water to the desired level, with the concentration being dependent upon the particular acid used. It has been found that the acid in the water solubilizes a portion of the mineral phosphate. For example the mineral phosphate is solubilized according to Equation 2 when phosphoric acid is used. Similar reactions occur to solubilize the phosphate in the mineral when other acids, such as sulfuric acid, are used. The amount of phosphate, that is solubilized by processing, indicates that a significant portion of the mineral phosphate is solubilized by another unexpected mechanism.

Any source of urea pellets may be used. The urea pellets are wetted with water or an aqueous solution containing a small amount of acid that may range, for example, from about 2.5% of the urea to as much as about 5% of the urea used. Acids that may be used are the mineral acids, including phosphoric acid (including polyphosphoric acids), sulfuric acid, and nitric acid, or any other strong mineral acid. Organic acids such as acetic, citric, gluconic or lactic acid may be used as well.

At percentages of acid to urea above 4%, an auxiliary drying agent may be required. The drying agent may also be required when the urea is damp to aid in mixing. Materials such as diatomaceous earth, silica or a mineral phosphate source can be used as auxiliary drying agents. The coating of the urea with acid may be conducted in any conventional blending equipment for solids and liquids.

After blending the liquid and solid such that the surface of the urea appears uniformly damp, a phosphate salt, preferably a pulverized mineral phosphate is added. The mineral phosphate must be pulverized such that most of the material will pass an 80 mesh standard sieve. The weight ratio of the mineral compared to acid should be in the range of 10:1 to 25:1. When phosphoric acid is used, the mineral $P_2O_5$ to acid $P_2O_5$ (100% available) ratio may range from 2:1 to as much as 10:1. The actual ratio of mineral to acid must be determined by observing the product to determine whether the mineral has absorbed the acid applied to the urea surface. If the absorption appears incomplete and the product is sticky, more mineral or an auxiliary drying agent can be added. Blending is then continued until the product appears dry and flowable.

The mineral phosphate sources may be selected from fluoroapatite, carbonate apatite, or hydroxyapatite. These minerals are known more generally as rock phosphate and bone meals. In any case, the mineral phosphate source should be pulverized to pass through an 80 mesh standard screen (0.2 mm opening). The phosphate salt may also be a compound such as monoammonium phosphate, diammonium phosphate and monocalcium phosphate salt.

In the preferred embodiment of the invention, urea is blended with aqueous phosphoric acid (75%) in a weight ratio to urea of 3%. Following a mixing time of up to 5 minutes, a mineral phosphate source of the fluoroapatite class is added. A mineral $P_2O_5$ to acid $P_2O_5$ ratio of 6:1 is used. Mixing is continued for up to 15 minutes to permit the coating to bind. No auxiliary drying agent is used unless the original urea was damp in which case up to 0.5% of diatomaceous earth may be added with the urea before the phosphoric acid.

The following examples serve to illustrate the practice of the invention. Samples of the products formed were analyzed for nitrogen and phosphorus using standard fertilizer tests at a commercial laboratory (Association of Official Analytical Chemists procedures 955.4, 958.01, 963.03, 963.03 and 977.01). These analyses are shown in Table 1.

EXAMPLE 1

0.325 kilograms of urea pellets (46% N) was placed in a planetary mixer and while mixing 0.015 kg of 75% phosphoric acid (54% $P_2O_5$) was added. The mixture was mixed for 2 minutes and then 0.140 kg grams of pulverized phosphate (30.4% $P_2O_5$) rock was added followed by 0.002 kg of diatomaceous earth. The resulting mixture was mixed for an additional 8 minutes to obtained a free flowing product.

EXAMPLE 2

15.4 kilograms of urea (46% N) was placed in a tumbling mixer and while mixing 0.444 kg of 75% phosphoric acid (54% $P_2O_5$) was added. The mixture was mixed for 2 minutes then 6.71 kg of pulverized phosphate rock (30.4% $P_2O_5$) was added. The resulting mixture was mixed for an additional 15 minutes to obtained a free flowing powder.

EXAMPLE 3

14.2 kilograms of urea (46% N) was added to a tumbling mixer and while mixing 0.653 kg of 75% phosphoric acid (54% $P_2O_5$) was added. The mixture was mixed for 2 minutes then 7.78 kg of pulverized phosphate rock (30.4% $P_2O_5$) followed by 0.086 kg of diatomaceous earth. The resulting mixture was mixed for an additional 15 minutes to obtain a free flowing product.

EXAMPLE 4

5,284 kilograms of urea (46%N) was blended with 151 kg of 75% phosphoric acid (54% $P_2O_5$) in a vertical screw mixer along with 52277 kg pulverized phosphate rock (30.4% $P_2O_5$). The acid was added by spraying the surface of the urea in the mixer.

EXAMPLE 5

5595 kilograms of urea (46%N) was blended with 160 kg of 75% phosphoric acid (54% $P_2O_5$) in a vertical screw mixer along with 2410 kg pulverized phosphate rock (30.4% $P_2O_5$). The acid was added by spraying the surface the urea in the mixer.

EXAMPLE 6

6296 kilograms of urea (46%N) was mixed with 34 kg of diatomaceous earth then blended with 59 kg of 62% phosphoric acid (45% $P_2O_5$) in a vertical screw mixer. The phosphoric acid was added in two portions and the urea phosphoric acid mixture was blended for about 5 minutes. Following the blending of the phosphoric acid and urea, 2410 kg pulverized phosphate rock (30.4% $P_2O_5$) was added and the resulting product was mixed for an additional 10 minutes.

TABLE 1

Sample Analysis for Examples 1 through 6

|  | Example |  |  |  |  |  |
| --- | --- | --- | --- | --- | --- | --- |
|  | 1 | 2 | 3 | 4 | 5 | 6 |
| Product Formulation | | | | | | |
| Example Mass (kg) | 0.482 | 22.7 | 22.7 | 7711 | 8165 | 7257 |
| Mineral $P_2O_5$ (kg) | 0.0426 | 2.04 | 2.36 | 691 | 733 | 316 |
| Phosphoric Acid $P_2O_5$ (kg) | 0.0081 | 0.239 | 0.353 | 81.6 | 86.2 | 59.0 |
| Mineral $P_2O_5$ to Acid $P_2O_5$ Ratio | 5.3 | 8.5 | 6.7 | 8.5 | 8.5 | 5.4 |
| Product Analysis as a Fertilizer | | | | | | |
| Total Nitrogen % | 30.9 | 31.9 | 29.2 | 32.7 | 32.6 | 38.5 |
| Total $P_2O_5$ % | 11.1 | 9.90 | 11.6 | 8.63 | 8.57 | 5.16 |
| Available $P_2O_5$ % | 10.3 | 6.35 | 7.55 | 5.63 | 6.07 | 5.04 |
| Percent of Total $P_2O_5$ Available | 92 | 64 | 65 | 65 | 71 | 98 |
| Conversion of Mineral $P_2O_5$ to Available $P_2O_5$ | | | | | | |
| Available $P_2O_5$ (kg) | 0.0496 | 1.44 | 1.71 | 434 | 496 | 365 |
| Available Mineral $P_2O_5$ before Processing (kg) | 0.0165 | 0.789 | 0.916 | 268 | 302 | 130 |
| Acid P2O5 (kg) | 0.0081 | 0.239 | 0.353 | 81.6 | 86.2 | 59.0 |
| Expected Mineral $P_2O_5$ Converted by Acid | 0.0032 | 0.0953 | 0.141 | 32.5 | 34.4 | 23.5 |
| Mineral $P_2O_5$ Unexpectedly Converted by Processing (kg) | 0.0218 | 0.318 | 0.304 | 52.4 | 73.5 | 153 |
| Percent of Mineral $P_2O_5$ Unexpectedly Converted | 51 | 16 | 13 | 7.6 | 10 | 49 |

As previously noted, a fluoroapatite mineral can be reacted according to Equation 2 to form a salt that has a high available phosphate content. In terms of the theoretical stoichiometry of the reaction as given in Equation 2, 1009 grams of mineral is reacted with 1372 g of 100% phosphoric acid. Expressing this information in terms of $P_2O_5$ content, 424.2 g of mineral $P_2O_5$ must be reacted with 993.4 grams of $P_2O_5$ from phosphoric acid. Thus, the theoretical mineral $P_2O_5$ to phosphoric acid $P_2O_5$ ratio is 0.427 to 1. In practice more acid may have to be used.

What is unexpected, however, and what is not obvious from any prior art, is that greater percentage of the mineral $P_2O_5$ can be solubilized than that expected by Equation 2. The amount of available $P_2O_5$ in all samples shown in Table 1 is not explained by the amount of acid used. Selecting Example 5 in Table 1 where the mineral $P_2O_5$ ratio to acid $P_2O_5$ ratio was 8.5 to 1, the amount of acid $P_2O_5$ used (86.2kg) would be expected to convert 34.4 kg of mineral $P_2O_5$ to available $P_2O_5$. Based upon the sample analysis, 73.5 kg of mineral $P_2O_5$ more than expected was converted by processing. The trend to have a greater amount of mineral $P_2O_5$ converted to available $P_2O_5$ was observed with all samples (Table 1).

The effect upon the formation of ammonia from urea of the samples was also investigated. To conduct this analysis 200 g of soil was placed in a chamber to which 25 ml of water had been added. The water was used to ensure that the chamber would have a relative moisture content when measured by a hygrometer above 85%. A calibrated gas sensing ammonia electrode was introduced into the top of the chamber, followed by 5 grams of sample. The formation of ammonia gas was measured over time. Data for several samples is shown in Table 2.

TABLE 2

Ammonia Concentration in ppm. Measured by a Gas Sensing Electrode in a Sealed Chamber After Placing Coated and Uncoated Urea Samples on Moist Soil

| | Time (hours) | | | |
| --- | --- | --- | --- | --- |
| | 10 | 15 | 20 | 25 |
| Sample | ppm | | | |
| Uncoated Urea Sample 1 | 15 | 38 | 60 | 84 |
| Uncoated Urea Sample 2 | 36 | 66 | 94 | 96 |
| Urea Coating Example 3 Sample 1 | 4 | 6 | 10 | 24 |
| Urea Coating Example 3 Sample 2 | 3 | 14 | 27 | 47 |
| Urea Coating Example 4 Sample 1 | 7 | 23 | 40 | 44 |

Certain modifications and improvements will occur to those skilled in the art upon a reading of the foregoing description. Such modifications and improvements have been deleted herein for the sake of conciseness and readability but are properly within the scope of the following claims.

What is claimed is:

1. A method for producing coated urea comprising:
   a) providing urea pellets;
   b) wetting said pellets with a mineral acid selected from the group consisting of phosphoric acid and sulfuric acid to form acid-wetted pellets; and
   c) reacting said mineral acid with a pulverized, insoluble mineral phosphate selected from the group consisting of fluoroapatite, carbonate apatite and hydroxyapatite.

2. The method of claim 1, wherein said acid is phosphoric acid and the reaction product of said acid and said phosphate is calcium dihydrogen phosphate.

3. The method of claim 1, wherein the amount of mineral acid on said acid-wetted pellets is from about 2.5% to about 5% by weight of the urea in said acid-wetted pellets.

4. The method of claim 1, wherein said acid-wetted urea is further treated with a drying agent selected from the group consisting of diatomaceous earth, silica and a mineral phosphate.

5. The method of claim 1, wherein said mineral phosphate is pulverized to pass an 80 mesh sieve.

6. The method of claim 1, wherein the weight ratio of mineral to acid is in the range of from about 10:1 to about 25:1.

7. The method of claim 1, wherein the acid is phosphoric acid, and the mineral $P_2O_5$ to acid $P_2O_5$ ratio is from about 2:1 to about 10:1.

* * * * *